Patented Apr. 22, 1947

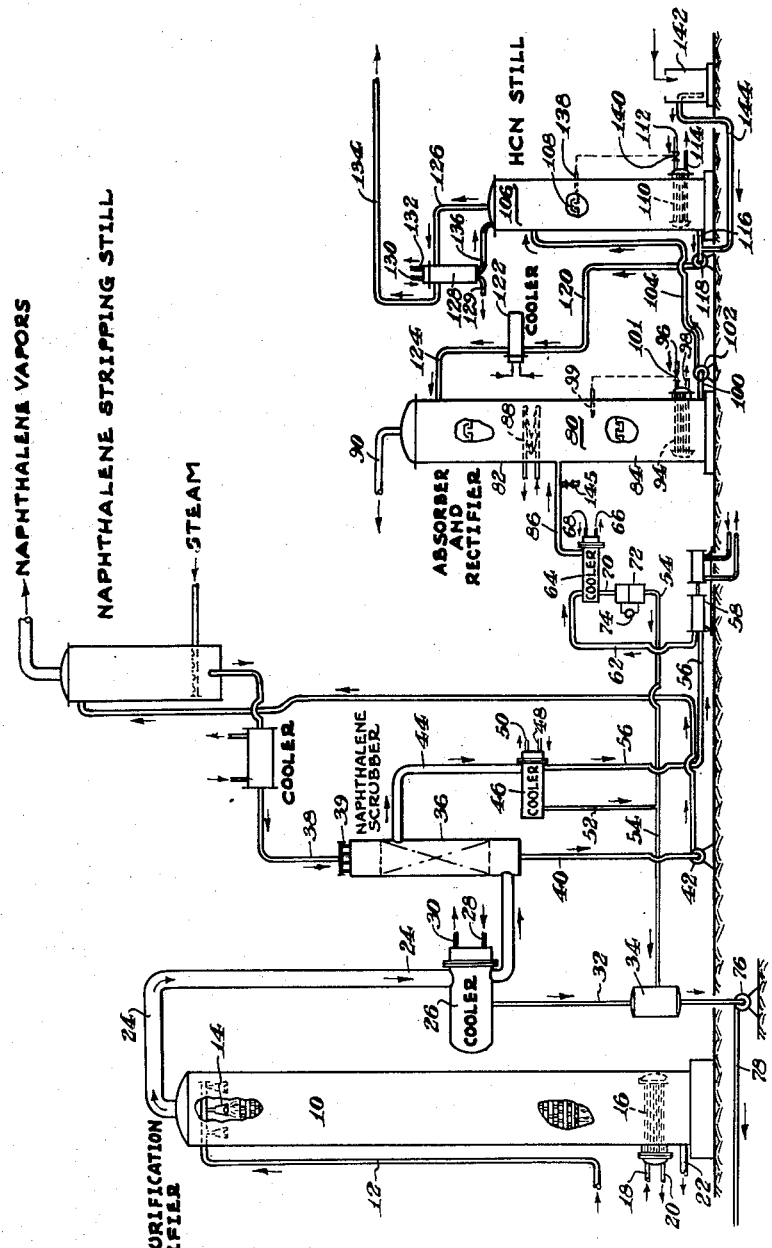

2,419,225

UNITED STATES PATENT OFFICE 2,419,225

HYDROGEN CYANIDE RECOVERY

John Mitchell, William H. Hill, and Herbert A. Gollmar, Pittsburgh, Pa., assignors, by mesne assignments, to Koppers Company, Inc., a corporation of Delaware Application October 14, 1942, Serial No. 462,046

7 Claims. (Cl. 23—151)

The present invention relates to the separation of a mixture of hydrogen sulphide and hydrogen cyanide into its constituent gases and is more particularly concerned with the recovery of hydrogen cyanide of high purity from the gaseous mixture evolved from fuels during their carbonization.

An object of the present invention is the provision of simple and effective method and means whereby hydrogen cyanide and hydrogen sulphide in gaseous admixture can be substantially completely separated from each other without altering their chemical constitutions.

A further object of invention is the provision of simple method and means whereby a hydrogen-sulphide-free solution of hydrogen cyanide can be directly obtained from a gaseous mixture containing the two said compounds.

A further object of improvement is to provide importantly simplified and practical method and means for recovering pure hydrogen cyanide directly from the mixture of acidic gases effluent to a liquid-purification process for fuel gases.

A further object of invention is provision of simple means whereby hydrogen cyanide can be directly absorbed from a gaseous mixture comprising also hydrogen sulphide and thereafter be recovered substantially quantitatively in pure form without loss in consequence of its polymerization, oxidation, or the like.

It is well-known in the art that water can be employed as the scrubbing medium preferentially to absorb hydrogen cyanide from a gaseous mixture also containing hydrogen sulphide. There has long been, however, no adequate answer to the need for simple and effective method and means for substantially completely purging the so-produced hydrogen-cyanide solution of the minor amount of hydrogen sulphide, that is simultaneously and unavoidably also absorbed therein, without important loss of the absorbed hydrogen cyanide. Only devious and cumbersome expedients have been provided for the purpose. For example: in some instances, large volumes of sweep or carrier-gases or vapors have been flowed through relatively dilute hydrogen-cyanide solutions under conditions that permitted the removal and retention of respectively the hydrogen sulphide and hydrogen cyanide; in other instances, additions of such agents as sulphur dioxide or halogens in proportions that are capable of oxidizing the hydrogen sulphide to the more easily separable elemental sulphur, have been suggested; in other instances, the hydrogen-cyanide solutions have been purged of their hydrogen-sulphide content by its conversion into easily separable insoluble metallic sulphides by addition of appropriate metal salts such as those of copper or lead. All these said expedients require careful supervision and chemical control, and special features of apparatus with their incidental operating machinery which considerably complicate the smooth operation of a commercial installation, especially if included as steps in a continuous process.

It has now been surprisingly discovered that simple distillation accompanied by vapor rectification is sufficient to remove substantially completely the entire hydrogen-sulphide content of even strong aqueous solutions of hydrogen cyanide, and with only inconsequential loss of the latter from the rectified solution, if the acidity of said solutions is maintained at or below a pH value of about 5.5 and preferably within the range of about 3 to 4. Hydrocyanic acid is a relatively weak acid and its strong aqueous solutions have, when cool and freshly-prepared, a pH of about 5.3. Hydrogen sulphide can be relatively satisfactorily removed therefrom by simple distillation if their pH values are maintained constant at or close to the said pH value. Even at ordinary temperatures, however, and especially so when they are heated, chemical changes take place in hydrogen-cyanide solutions which cause them to darken and their pH relatively rapidly to drift to values above 6 or more, and at these higher values, such solutions exhibit such marked increase in their tendency to retain hydrogen sulphide, during their rectification, that a satisfactorily complete removal of hydrogen sulphide without very high losses of hydrogen cyanide becomes impossible. If, however, the acidity of the hydrogen-cyanide solutions are stabilized by the addition thereto, or by the presence therein of, an extraneous strongly acid-reacting body in sufficient quantity to maintain their pH at about 5.5 and preferably within the range of 3 to 4, the hydrogen sulphide can be rapidly removed under rectifying conditions permitting retention of most of the hydrogen cyanide in its solutions. Appropriate reagents for such stabilization are: formic, phosphoric, and sulphuric acids; salts such as sodium acid citrate, sodium acid sulphate, or the like; and even acidic gases such as sulphur dioxide and carbon dioxide in appropriate amounts.

Acids and salts that are non-volatile at the temperatures of rectification are preferred because such agents are automatically excluded as a contaminant from any produced distillate and are retained for re-use in the aqueous portion of the hydrogen-cyanide solution in the event the same is recycled to an absorption step of a continuous process for further absorption of hydrogen cyanide from a gaseous mixture, as will be hereinafter more fully explained. Acidic salts are also preferable to acids for the stated purpose because of their buffer-like action in the hydrogen-cyanide solutions; that is, a larger quantity of the former can be present in a hydrogen-cyanide solution without altering its pH value, than is the case with the latter, and said salts, in consequence, serve as a reservoir of reagent to reduce that tendency of hydrogen-cyanide solutions where limited amounts of acids alone are employed for establishing the required pH, continually to drift upwardly to pH values that are too high to permit satisfactorily effective hydrogen-sulphide removal. Within the preferred stated range of pH values of about 3 to 4, hydrogen cyanide in aqueous solutions shows little or no tendency to polymerization even at their boiling points nor to hydrolyze to ammonia, the latter reaction progressing relatively rapidly both in the presence of the stronger acidities and of alkalis.

According to the present invention, therefore, a gaseous mixture containing both hydrogen cyanide and hydrogen sulphide is processed for the recovery of its content of the former by scrubbing the same in an absorption step preferably with acid water having a pH that is maintained at below about 5.5 and at preferably between 3 and 4, their rates of contact and their temperatures being mutually so correlated as selectively to absorb in the acid water substantially all the hydrogen cyanide. The resultant solution, that contains a minor portion of hydrogen sulphide which is unavoidably also absorbed from the said gaseous mixture, is thereafter flowed into a rectification step and heated, said solution's entire content of hydrogen sulphide being, in consequence of its pH of invention, substantially completely removed in simple manner as over-head vapor having a minor content only of hydrogen cyanide. The said over-head vaporous mixture can then be introduced into the said absorption step and there treated for removal of its content of hydrogen cyanide in the acidic water flowed therethrough.

By the practice of these simple process steps while employing acid water, within the stated pH range, as the absorbing medium, substantially the entire hydrogen-sulphide content of a gaseous mixture thereof containing also hydrogen cyanide is present in the gaseous effluent from the said absorption step whereas said mixture's hydrogen-cyanide content issues from the rectification step in solution in the effluent acid water which is free of hydrogen sulphide. The so-separated hydrogen cyanide can then be utilized as preferred. It can be directly neutralized by caustic alkalis while still in solution in the acid scrubbing water to form crystallizable sulphur-free alkali cyanide salts. If the relatively small amount of reagent chosen for maintaining the scrubbing water at the pH of invention, is not a serious contaminant for their proposed use. Or, if cyanides of higher purity are required, and a non-volatile reagent has been employed to maintain the pH of invention in the scrubbing water, the hydrogen cyanide can, by virtue of such pH value, be substantially quantitatively distilled from the rectifier-effluent water without exhibiting its well-known and marked tendency at higher pH values to polymerize into solid compounds that would both be deposited in the distilling equipment and obstruct passage therethrough and constitute loss of product, and the distilled hydrogen-cyanide gas can then be neutralized with alkalis to form pure salts; or it can be dried and liquefied as preferred.

The above-described absorption and rectification steps of the present improved process can be operated separately, or in combination as features of a cyclic process, and at reduced, or normal, or elevated pressures.

The above-described process of invention and its features are of special utility for the recovery of refined hydrogen cyanide, or its salts, from gases evolved from fuels in the course of their destructive distillation. During the removal of hydrogen sulphide from, for example, coke-oven gas by scrubbing the same with such aqueous alkaline solutions as those of sodium carbonate, sodium phenolate, alkyl amines, phosphates, salts of weak acids, and the like, hydrogen sulphide along with such other weakly acidic gases as hydrogen cyanide, carbon dioxide, and the like, are absorbed in the employed scrubbing solution and during spent-solution regeneration, the said absorbed acidic gases are expelled therefrom in gaseous admixture. They can be produced in especially concentrated form in those instances where the said solution-regeneration is effected by means including a boiling thereof because their removal is thus accomplished by steam which functions as a sweep-or carrier-gas that can be easily separated from the so-expelled gases by simple condensation. Such process for removing hydrogen sulphide from carbonization gases and employing this method of spent-solution regeneration has become known in the art as a "hot-actification" purification process. A typical acidic gaseous mixture, that is effluent to such purification process and is derived from coke-oven gas, contains, for example, about 60% hydrogen sulphide, 15% hydrogen cyanide, and 25% carbon dioxide. If such gaseous mixture is treated according to the features of the present improved process, its content of hydrogen sulphide, carbon dioxide, and the like, pass substantially quantitatively out of the absorption step of said process, whereas the hydrogen cyanide is retained in sulphide-free aqueous solution in the acid water issuing from the rectification step where it is available for any preferred utilization.

In the accompanying drawing forming a part of this specification and showing for purposes of exemplification a preferred apparatus and method in which the invention may be embodied and practiced but without limiting the claimed invention specifically to such illustrative instance or instances, the single figure is a diagrammatic elevational view, with parts broken away, of apparatus adapted for practicing the present improvement for the separation of hydrogen sulphide and hydrogen cyanide and for the recovery of the latter in substantially pure form, especially from carbonization gases.

Referring now to the drawing: a packed tower 10 is the actifier column for a conventional hot-actification liquid-purification process. Alkaline solution such as one of sodium carbonate, sodium phenolate, or alkyl amine, which has been employed for scrubbing, for example, coke-oven gas and has thus absorbed acidic constituents therefrom, is delivered through pipe 12 to nozzles 14 disposed in the top of the said column. Within the said actifier tower absorbed acidic gases, consisting mainly of hydrogen sulphide, hydrogen cyanide and carbon dioxide, are stripped from the absorbent solution by its heating to boiling with indirect steam delivered to steam coils 16 through pipe 18 and discharged therefrom through pipe 20. Actified absorbent solution is discharged from the tower through pipe 22 at its base and is returned to an absorber (not shown) for scrubbing further quantities of coke-oven gas.

The so-stripped acidic gases, comprising those above-mentioned, and, in addition, a large quantity of water vapor and especially some naphthalene, where coke-oven gas is being processed, flow from the top of actifier column 10 through pipe 24 into indirect water-condenser 26 that is supplied with inlet water pipe 28 and discharge pipe 30. The mixture of acidic gases is cooled in the said condenser 26 to a temperature of about 100° F. or one at least higher than its dewpoint of naphthalene, and that portion of the water vapor, condensed by such cooling, is drained from the said condenser through drain line 32 to condensate-collecting tank 34. This condensation step advantageously prevents the accumulation of water in the hereinafter described naphthalene stripping step.

This partially dried and cooled mixture of acidic actifier-gases is thereafter flowed to a naphthalene scrubber 36, that contains space packing, wherein they come into countercurrent contact with a descending flow of an absorbent oil for naphthalene, preferably a petroleum-derived straw oil, which is fed to the top of the absorber 36 through feed pipe 38 and is sprayed onto the said space packing from spray header pipe 39. The naphthalene-enriched absorbent oil is discharged from scrubber 36 through pipe 40 and is pumped by pump 42 to the naphthalene-stripping still before being recycled to scrubber 36 through said line 38.

The naphthalene-free and now partially-dried mixture of acidic gases flows out of scrubber 36 through pipe 44 to a second indirect water-cooled condenser 46, which is supplied with inlet and outlet water pipes respectively 48 and 50, and wherein further quantities of water vapor are removed from the mixture of acidic gases and its temperature is further lowered to approximately 75° F. Condensate therefrom is discharged through drain pipe 52 and connecting pipe 54 to condensate-collecting tank 34. The cooled mixture of acidic gases, effluent to the said condenser 46, flows through pipe 56 to steam-operated vacuum pump 58 which is employed to maintain a vacuum on the said actifier 10 and its appurtenant apparatus. The actification can of course be operated at normal pressures, if preferred. The gases flowing from the discharge end of the said vacuum pump are delivered through pipe 62 into a small indirect water-cooled condenser 64, having conventionally supplied inlet and outlet cooling-water pipes 66 and 68, and wherein the heat of compression that is produced by restoring the gases to atmospheric pressure, is removed, and a further amount of water vapor is condensed. This further condensate of water vapors is drained from the said condenser through a drain pipe 70 and a water seal 72, having liquid level control 74, whence it flows to drain pipe 54 and thence into the said condensate collecting tank 34.

The various condensates of water vapor from the mixture of acidic gases and which, as has been hereinbefore described, have been produced during its steps of gradual cooling are, after their delivery to collecting tank 34, pumped therefrom by pump 76 through return line 78 to the carbonization-gas purification system wherein they are added to the employed absorbent solution as make-up water therefor and for recovery of their small content of incidentally absorbed acidic gases.

The now cooled and substantially naphthalene-free mixture of acidic gases flows from cooler 64, through pipe 86, into column 80 that is functionally divided above and below said inlet pipe 86 into an absorber and a rectifier section, respectively, 82, 84, the both of which are provided with a plurality of bubble-cap trays of conventional design. The said mixture of acidic gases introduced through column-inlet pipe 86 flows upwardly through the bubble-cap trays of the absorber-section 82 and into contact with a descending flow of cold acid water having preferably a pH within the range of about 3 to 4, the temperatures of said gaseous mixture and said water and their rates of flow being all so correlated that substantially all the hydrogen cyanide of said gaseous mixture is absorbed in the acid water. The bubble-cap trays of the absorber-section can be expediently supplied with cooling coils 88 that can be disposed upon one or more of the bubble-cap trays, their number depending upon the preferred amount of cooling to be produced which in turn is determined by temperatures and flow-rates of the gaseous mixture and of scrubbing acid water and especially by the hydrogen-cyanide concentration of the entering gaseous mixture. Gases which are unabsorbed by the cool acid water and which comprise substantially only hydrogen sulphide and carbon dioxide, are flowed from the top of column 80 through effluent line 90 to any preferred delivery such, for example, as liming means for the removal of the carbon dioxide and the production thereby of pure hydrogen sulphide, or to a sulphuric-acid plant, or the like.

In the event stabilization of the pH of the hydrogen-cyanide solutions is established by addition of volatile acidic gases such as sulphur dioxide, large quantities of carbon dioxide, or the like, the required stabilizing quantities of such gas can be introduced through pipe 145 into the mixture of hydrogen cyanide and hydrogen sulphide entering apparatus 80, through pipe 86, where their simultaneous absorption can take place in the solution formed.

After traversing the bubble-cap trays of absorber-section 82 of column 80, the cold acid water now containing in solution the hydrogen cyanide of the acidic gaseous mixture brought into contact therewith along with a small amount also of its hydrogen sulphide and still having a pH preferably within the range of about 3 to 4, overflows from the lower bubble-cap tray of said absorber-section 82 onto the upper bubble-cap tray of the lower and rectifier-section 84 of said column 80, said rectifier-section being furnished at its lower part with indirect steam coil 94 that has a valved inlet-pipe 96 and a condensate outlet-pipe 98. Sufficient steam is introduced into steam coil 94, through the valve of its inlet-pipe 96, to heat such acid absorbent water to a rectifying temperature at which, assisted by its pH of invention, its hydrogen-sulphide content is substantially completely volatilized therefrom at least by the time it enters pump 102 of solution outlet-pipe 100 at the bottom of said absorber-section and by said pump is forced through insulated solution-line 104 into the upper part of hydrogen-cyanide still 106. The so-volatiliz hydrogen sulphide along with a minor amount of hydrogen cyanide, that is incidentally volatilized from the acid solution at the temperature of rectification, flow upwardly through successive trays of the rectifier-section 84 and eventually pass into admixture with new quantities of the to-be-treated acidic gaseous mixture entering column 80 through its inlet pipe 86, and, in such admixture, enter the absorber-section 82 where the said minor amount of hydrogen cyanide is re-absorbed in new quantities of cool acid water flowing through said absorber-section, whereas the rectified hydrogen sulphide passes from the absorber-section through its outlet-line 90 in admixture with the unabsorbed hydrogen sulphide of said inflowing new quantities of acidic gaseous mixture. Thus, the acidic gaseous mixture introduced into column 80 is separated therein into a sulphide-free aqueous solution of hydrogen cyanide having a pH of preferably within the range of about 3 to 4, and into substantially cyanide-free gaseous hydrogen sulphide. Unless unusual proportions of carbon dioxide, or the like, are present in said inflowing acidic gaseous mixture, it also passes from the column 80 in admixture with the gaseous hydrogen sulphide, because any carbon dioxide introduced into the rectifier-section in the hydrogen-cyanide solution is also volatilizable therefrom at the pH of invention without important loss of hydrogen cyanide.

The rectification temperature of the acid solution of hydrogen cyanide flowing through rectifier-section 84 is automatically maintained at an established level by a temperature responsive device that controls the flow of steam to steam coil 94, said device comprising, thermocouple 99, which is disposed between two of the upper bubble-cap trays of said absorber-section and controls the action of valve means 101 disposed in steam inlet-pipe 96.

The hydrogen-cyanide still 106 comprises a series of superposed bubble-cap trays 108, and, in the lower part thereof, a steam heating-coil 110 that is provided with valved steam inlet-line 112 and exhaust steam outlet-line 114 for indirectly heating solution flowed through said still. The still is further provided with a solution discharge-pipe 116 through which solution that has passed through the still column can be drained under the influence of pump 118 into pipe 120, whereby it is delivered to indirect water-cooler 122 whence it is returned through feed-pipe 124 into the upper part of absorber-section 82 of the column 80 for further absorption of hydrogen cyanide.

In the event that it is preferred to recover the sulphide-free hydrogen cyanide, that is in solution in the acid absorbing water which issues from rectifier-section 84 of column 80, either in gaseous or liquefied form, or to separate it from the minor amount of a non-volatile reagent, employed in said solution to maintain the same at the pH value provided by the present invention, such solution is forced by pump 102 through pipe 104 into the upper part of still 106. Flowing down over the series of trays 108, the hydrogen-cyanide solution is heated by steam, introduced into coil 110, sufficiently to volatilize the hydrogen cyanide which flows from the top of the still through outlet-pipe 126 into indirect water-cooled condenser 128 for removing water vapor therefrom; condenser 128 is supplied with the conventional inlet and outlet water lines respectively 130, 132. The cooled, substantially pure gaseous hydrogen cyanide flows from said condenser 128 through product delivery-pipe 134 to any preferred means for its utilization. Aqueous condensate produced in water-cooler 128 can be drained therefrom through pipe 136 to the uppermost tray of the still for purposes of reflux and recovery of any hydrogen cyanide dissolved therein. The condenser 128 can be, in addition, equipped with a liquid-product pipe 129 whereby, in those instances where the vapors entering condenser 128 are cooled, for example, to substantially complete condensation, that liquid condensate which is not returned through pipe 136 into the top of the still for purposes of reflux can be withdrawn from the condenser to storage as product.

Distillation temperatures in the hydrogen-cyanide still are controlled by a thermocouple 138 that is disposed upon an upper tray of said still and controls operation of an automatic valve 140 located in the steam inlet-pipe 112.

The substantially hydrogen-cyanide free absorbent water with its non-volatile acidifying agent is drained from the bottom of still 106 through drain-pipe 116 and, by means of pump 118, is forced through line 120 into condenser 122 whence, after cooling therein, is delivered into line 124 and thereby returned to the upper part of absorber-section 82 for absorbing further quantities of hydrogen cyanide from the acidic gaseous mixture introduced thereinto from its delivery-line 86.

Make-up water for the system is added at a point in line 116 preferably just before the pump 118. Any make-up water, or required additions of acidifying agent to the absorbent water for the hydrogen cyanide recovery system, is first introduced into mixing tank 142 and thereafter siphoned into pipe 144 whence they are forced by pump 118 into the liquor circuit of the process.

The following examples are illustrative of the results that can be obtained, by practice of the hereinabove described cyclic process for the recovering of pure hydrogen cyanide from gaseous mixtures thereof also containing hydrogen sulphide, and clearly point out the advantages that accrue from stabilizing the pH of hydrogen-cyanide solutions during their formation and rectification.

*Example 1*

A substantially moisture- and naphthalene-free gaseous mixture, consisting of $H_2S$, HCN, and $CO_2$ in the usual volume ratio of respectively 65, 15, and 25 per cent. in which they are present in gases effluent to a hot-actification purification process for fuel gases, was flowed at a temperature of 75° F. into an absorber apparatus consisting of nine bubble-cap trays. In said absorber, the gaseous mixture was countercurrently scrubbed with non-acidulated water introduced into the top thereof at a temperature of 41° F. and at a rate of 7.93 gallons per M cubic feet of scrubbed gaseous mixture.

The temperature of the gaseous mixture leaving the top of the scrubber was substantially that of the inflowing scrubbing water and over 92% of its hydrogen cyanide was absorbed in the scrubbing water at the stated scrubbing rate. The aqueous solution effluent to the absorber apparatus showed a concentration of 111.0 and 1.87 g. p. l. of respectively HCN and $H_2S$; in other words, these said constituents, that were present in the original gaseous mixture in the respective ratio of about 1 to 4.3, were easily concentrated in the respective ratio of approximately 60 to 1 in the scrubbing water at the stated temperatures and rates of contact of water and gaseous mixture.

Hydrogen-cyanide solution having the above analysis was fed into the top of a rectifying column that comprised 5 bubble-cap trays and communicated at its bottom with a heated still-kettle whereby the downflowing hydrogen-cyanide solution was heated to temperatures as high as 108°, 110°, 131°, 171° F. on, respectively, the top to the fourth bubble-cap tray for the purpose of removing by rectification the hydrogen sulphide while retaining the hydrogen cyanide. Even at the relatively high temperatures stated, only about 50% of the hydrogen sulphide could be removed from the solution; the hydrogen cyanide retention was very poor at the stated rectifying temperatures; and a brownish deposit began after a short time to accumulate on the bubble-cap trays and in the hydrogen-cyanide solution. The scrubbing water employed in the absorption step having not been previously acidified and stabilized as provided by the present invention, the pH of the resultant hydrogen-cyanide solution soon reached a value of 6.5 and eventually became black.

*Example 2*

In the following example, the benefits derived by practicing the above-described absorption and rectification steps, while employing previously acidulated scrubbing water as the hydrogen-cyanide absorption medium, become apparent.

By scrubbing the same gaseous mixture, as described in Example 1, with water of 65° F. at the rate of 45 gallons per M cubic feet of treated gas, the aqueous hydrogen-cyanide solution leaving the absorption step contains 42.5 g. p. l. of absorbed hydrogen cyanide and 0.73 g. p. l. of hydrogen sulphide. Such a hydrogen-cyanide solution, that was also N/100 in its content of NaHSO4 and had in consequence a pH of about 2.2, was rectified in a rectifying column as described in Example 1 while maintaining temperatures of 75°, 77°, 81°, and 102° F. on respectively the top, second, third and fourth bubble-cap trays. Even at these relatively low temperatures of rectification all but the merest traces of hydrogen sulphide was easily rectified out of the hydrogen-cyanide solution, which thereafter did not darken lead acetate, and the reduction in its hydrogen-cyanide concentration was relatively minor. The resultant sulphide-free rectified solution was water clear and colorless and any evidence of conversion of the hydrogen cyanide to other compounds, such as its polymerization products, was entirely absent.

The said solution of hydrogen cyanide was then boiled to recover said compound in pure gaseous form. The residual aqueous portion was still colorless and clear and still had a pH of 2.2 and was thus returnable to the hydrogen-cyanide absorption step for absorption of further quantities of said compound from the effluent actifier gases.

*Example 3*

In another example, a hydrogen-cyanide solution that was stabilized at a pH of 5.5 with H2SO4 and contained approximately 120 g. p. l. and 0.85 g. p. l. of respectively hydrogen cyanide and hydrogen sulphide, was rectified in the apparatus described in Example 1 while maintaining temperatures of 75°, 76°, 79°, 93° on respectively the top, second, third and fourth bubble-cap trays. There was substantially no change in the hydrogen-cyanide content of the rectified solution. Its hydrogen-sulphide content had been reduced to only 0.05 g. p. l. and its pH was 5.4.

Other compounds that showed themselves of special utility in establishing the pH conditions of invention in the aqueous scrubbing water were phosphoric acid (H3PO4), formic acid, mono ammonium and mono sodium phosphate (NH4H2PO4 and NaH2PO4), but any compound, or compounds, adapted to stabilize and to maintain aqueous solutions of hydrogen cyanide at a pH of at most about 5.5, in the above-described process steps, is of utility for and comes within the scope of the present invention. Although at the said pH of 5.5, hydrogen sulphide is easily rectifiable from aqueous hydrogen-cyanide solutions, the preferred range of pH is about 3 to 4 because it not only permits easy removal of the hydrogen sulphide but in addition protects the hydrogen-cyanide against destructive side-reactions. As shown in the specific examples, however, even lower pH values are useful.

The invention as hereinabove set forth is embodied in particular form and manner but may be variously embodied within the scope of the claims hereinafter made.

We claim:

1. A process for recovering HCN substantially free from H2S from fuel gas comprising, absorbing HCN and H2S from fuel gas by means of an aqueous scrubbing liquid; stripping HCN and H2S therefrom and passing the stripped gases to a selective absorbing zone; supplying an absorbent liquid to said zone to absorb substantially all the HCN and at most a small amount of H2S; rectifying the absorbent solution containing dissolved gases while acidified with an auxiliary acidic medium to maintain a pH in the range of 2.2 to 5.5, and returning overhead vapors containing substantially all the incidentally absorbed H2S and at most a minor quantity of HCN to the selective absorption zone; withdrawing absorbing liquid containing HCN from the rectification; distilling HCN therefrom; and returning the acidified absorbent to the absorption step.

2. A process as claimed in claim 1, and in which the aforesaid pH value of the selective absorbent liquid is maintained by an acidic salt that is non-volatile at the employed temperatures of the said rectification and of the said distillation of the absorbent liquid after its discharge from said absorption step, and in which said acidic salt is present in such amounts, larger than is necessary to produce the aforesaid pH value, as to serve as a reservoir of reagent.

3. A process as claimed in claim 1, and in which the aforesaid pH value of the absorbent liquid is maintained by means of a reagent comprising one of the group consisting of acids and acidic salts that are not volatile at the temperatures of both the said rectification and distillation steps.

4. A process for recovering HCN substantially free from H2S from fuel gas comprising, absorbing HCN and H2S from fuel gas by means of an aqueous scrubbing liquid; stripping HCN and H2S therefrom and passing the stripped gases to a selective absorbing zone; supplying an absorbent liquid to said zone to absorb substantially all the HCN and at most a small amount of H2S; rectifying the absorbent solution containing dissolved gases while acidified with an auxiliary acidic medium to maintain a pH in the range of 2.2 to 5.5, and returning overhead vapors containing substantially all the incidentally absorbed H2S and at most a minor quantity of HCN to the selective absorption zone; withdrawing absorbing liquid containing HCN from the rectification; and recovering the absorbed HCN.

5. A process as claimed in claim 4, and in which the steps of selective absorption, rectification, and return of overhead vapors, are all carried out in a single tower, and in which the stripped gases are introduced to the single tower at a region between the selective absorption step and the boiling section of the rectification step of the process.

6. A process as claimed in claim 4, and wherein the aqueous scrubbing solution employed for scrubbing the HCN and $H_2S$ from the fuel gas is strongly alkaline and has high capacity for absorption of said compounds and from which they can be liberated in the stripping step that comprises boiling the solution of absorbed said gases, and also wherein the pH value of the selective absorbent liquid for the step of HCN recovery is maintained by the presence in said liquid of an acidic salt that is non-volatile at the temperature of rectification and is present in such excess amount of that required to provide the aforesaid pH value as to serve as a reservoir of acidic salt for the purpose.

7. A process for recovering HCN substantially free from $H_2S$ from fuel gas comprising, absorbing HCN and $H_2S$ from fuel gas by means of an aqueous scrubbing liquid; stripping HCN and $H_2S$ therefrom and passing the stripped gases to a selective absorbing zone; supplying an absorbent liquid to said zone to absorb substantially all the HCN and at most a small amount of $H_2S$; rectifying the absorbent solution containing dissolved gases while acidified with an auxiliary acidic medium to maintain a pH in the range of 2.2 to 5.5, to remove as final exit overhead vapors substantially all the incidentally absorbed $H_2S$; withdrawing absorbing liquid containing HCN from the rectification; and recovering the absorbed HCN.

JOHN MITCHELL.
WILLIAM H. HILL.
HERBERT A. GOLLMAR.

REFERENCES CITED

The following references are of record in the file of this patent:

UNITED STATES PATENTS

| Number | Name | Date |
|---|---|---|
| 2,088,003 | Sperr | July 27, 1937 |
| 1,817,667 | Blau | Aug. 4, 1931 |
| 1,908,633 | Hansen | May 9, 1933 |

FOREIGN PATENTS

| Number | Country | Date |
|---|---|---|
| 308,786 | British | 1930 |